Dec. 9, 1924.
J. N. KELLY
AUTOMOBILE LOCK
Filed March 8, 1920
1,518,150
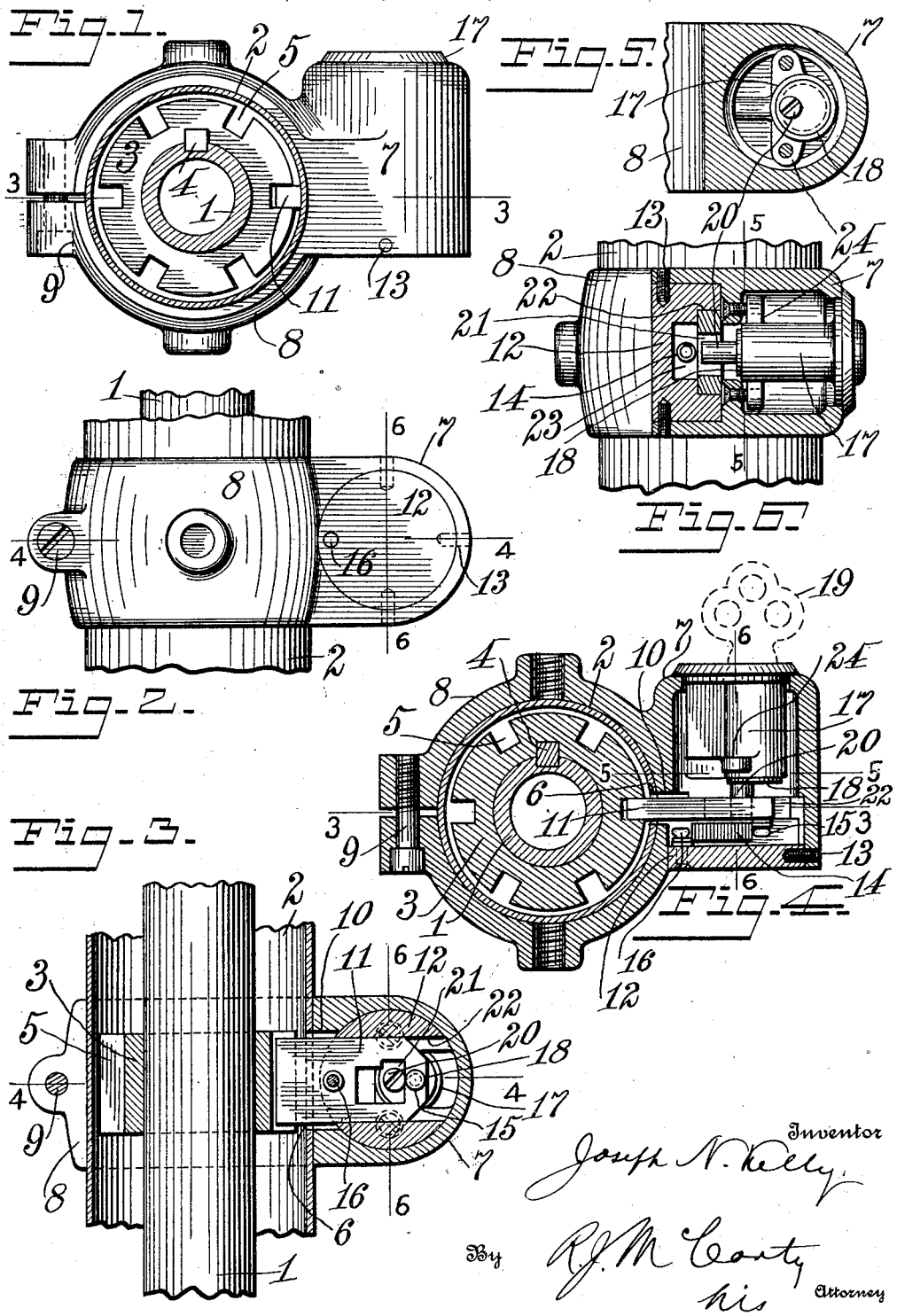

Patented Dec. 9, 1924.

1,518,150

UNITED STATES PATENT OFFICE.

JOSEPH N. KELLY, OF DAYTON, OHIO.

AUTOMOBILE LOCK.

Application filed March 8, 1920. Serial No. 364,177.

*To all whom it may concern:*

Be it known that I, JOSEPH N. KELLY, a citizen of the United States, residing at Dayton, in the county of Montgomery and State of Ohio, have invented certain new and useful Improvements in Automobile Locks, of which the following is a specification.

This invention relates to new and useful improvements in locks especially adapted for locking the steering posts of automobiles so that the steering gear cannot be operated by unauthorized persons.

The object of the invention is to provide a simple and efficient locking device by means of which the steering post is made stationary while the automobile is not in use. The said locking device possesses the novel features hereinafter described and claimed.

Preceding a particular description of the invention reference is made to the accompanying drawings of which Fig. 1 is a cross sectional view of a steering post and the inclosing tubular column thereof to which my improved locking device is applied. Fig. 2 is a side elevation of the device in position, the steering post and its inclosing tubular column being broken away above and below. Fig. 3 is a vertical sectional view on the line —3—3— of Fig. 1. Fig. 4 is a horizontal sectional view on the line —4—4— of Fig. 2. Fig. 5 is a sectional view of the lock-housing on the line —5—5— of Fig. 4. Fig. 6 is a sectional view on the line —6—6— of Fig. 2.

In a more particular description of my improved locking device, similar reference numerals indicate corresponding parts both in the description and the drawings.

The locking device is utilized in connection with the steering post —1— and the inclosing tubular column —2— thereof, both of which are shown in an abbreviated form in the drawings because of the fact that these features are well known and require no extended illustration. It is understood that the steering post —1— at its upper end supports the usual steering or hand wheel. On the interior of the tubular column —2— is housed a locking member —3— which constitutes one element of the locking device. This locking member —3— may be rigidly united to the steering post —1— in any suitable way, for example by means of a key —4—. The periphery of said locking member —3— is provided with a suitable number of recesses or square notches —5—, which, in turning the steering post —1—, are brought opposite or in line with an opening —6— in the tubular column —2—. A lock-housing —7— is an integral part of a collar or clamp —8— which embraces the tubular column at the point where the locking member —3— is placed on the steering post. This collar or clamp is rigidly secured in position by a screw —9— which penetrates apertured extensions thereof. The said clamp, where it unites with the lock-housing —7—, is provided with a slot —10— which leads to the interior of said lock-housing and through which the bolt —11— of the lock may pass and engage any of the recesses or openings —5— in the said locking member —3—, when one of said openings —5— is moved in alinement with the opening —10—. The lock-housing —7— has an end thereof inclosed by a base plate —12— which is secured thereto by a suitable number or screws —13—, and between this plate —12— and the bolt —11—, a spring —14— is placed. One end of this spring —14— is secured to a pin —15— which is made fast to the outer end of the bolt —11—, and the other end of said spring is made fast to a pin —16— which is secured to the base plate —12—. It will be seen therefore that the action of the spring causes the bolt —11— to enter a recess —5— in the locking member —3— when one of said recesses is brought in alinement with the opening —10—. The movement of the bolt —11— into and out of interlocking engagement with the locking member —3— is controlled by means of a lock, which is preferably key operated and the housing —17— of which is inclosed within the casing or housing —7—, and is made secure thereto. The cylinder or tumbler —18— of said lock is rotatable by a key —19—, and the inner end of said tumbler has an eccentric pin —20— projected therefrom which enters a slot —21— in the bolt —11—, which is so arranged that when the tumbler is rotated in a direction to retract the bolt the pin 20 will engage the rear wall of the slot and withdraw the bolt against the action of the spring 14. Further, the depth of the slot below the center line of the tumbler is such that the tumbler can be rotated through a partial revolution only, making it necessary to reverse the movement of the tumbler and return the same to its initial position before the key can be removed. The amount of rearward movement which can be imparted to the tumbler is sufficient to carry the pin to its rearmost position and slightly past the same so that it will lie below the center line of the tumbler. Consequently, the action of the spring on the bolt will tend to continue the movement of the tumbler in a rearward direction and, as further movement in that direction is prevented by the pin engaging the bottom of the slot, the bolt will be held in its retracted position until the tumbler is moved in a reverse direction. The throw of the pin is such that the forward end of the bolt will not only be withdrawn from the locking member but will be carried some distance rearward therefrom. Consequently, the bolt will not enter the recess in the locking member until the tumbler has traveled a considerable distance in a forward direction. The slot 21 is provided with a forwardly extending offset portion, which in the present instance gives the slot substantially an L-shape, and this offset portion of the slot permits the pin and tumbler to continue their forward movement in the event the bolt engages the periphery of the locking member between the recesses, thereby enabling the key to be removed after the bolt has been placed in a locking condition regardless of whether or not it has entered one of the recesses. So far as the locking of the machine is concerned it is immaterial whether the bolt immediately enters one of the recesses or whether it bears against the periphery of the locking member between the recesses, for in the latter event a slight movement of the steering wheel in either direction will bring a recess into alinement with the bolt and the latter will be forced into the recess by the action of the spring, thus in order to lock the machine it is only necessary to turn the key forward and remove the same without the necessity of setting the steering wheel in an exact position. The bolt —11— slides on guide-ways —22— formed in the base plate —12— of the lock casing, and on a side of said bolt —11— a recess —23— is provided in the base plate in which the spring —14— lies. The lock-housing —17— has apertured projections —24— extending from the inner end thereof which receive screws by means of which said lock-housing is secured to the main housing —7— as shown in Fig. 6.

While I have shown and described my steering gear locking device with some particularity, it will be understood that various structural modifications may be made therein without departing from the underlying principles of the invention as claimed. For example the locking member instead of being made in a separate piece attached to the steering post, may be integral with the steering post and the same results obtained.

Having described my invention, I claim:

1. The combination with a tubular structure and a member rotatably mounted in said tubular structure and provided with a circumferentially arranged series of locking recesses, of a lock housing rigidly secured to said tubular structure and having an opening leading to the interior of said tubular structure in line with said series of recesses, a bolt slidably mounted in said housing, a spring acting on said bolt to project the same through said opening into engagement with said rotatable device, said bolt having an opening therein, a rotatable member having a pin projecting therefrom and arranged off center to enter said opening and to actuate said bolt against the tension of said spring, said rotatable device having a limited rotation in a direction to retract said bolt, said parts being so arranged that when said rotatable device is moved to the limit of its movement the action of said spring will retain said bolt in its retracted position until said rotatable device is positively rotated in a reverse direction.

2. The combination with a tubular structure and a member rotatably mounted in said tubular structure and provided with a circumferentially arranged series of locking recesses, of a housing mounted on said tubular member and having an opening leading to the interior of said tubular structure in line with said series of recesses, a bolt slidably mounted in said housing and having a slot, a spring acting on said bolt to move the same through said opening into engagement with said rotatable member, a key actuated rotatable device mounted in said housing and having a pin arranged to enter the slot in said bolt and move the latter against the tension of said spring, said rotatable device having a limited movement in a direction to retract said bolt, said movement being sufficient to carry said pin beyond the center line so that said bolt will be retained in a retracted position until said rotatable device has been rotated in a reverse direction by the key.

3. The combination with a tubular structure and a member rotatably mounted in said tubular structure and provided with a circumferentially arranged series of locking recesses, of a housing mounted on said tubular member and having an opening leading to the interior of said tubular structure in line with said series of recesses, a bolt slidably mounted in said housing and having a slot, a spring acting on said bolt to move the same through said opening into engagement with said rotatable member, a key actuated rotatable device mounted in said housing and having a pin arranged to enter the slot in said bolt and move the latter against the tension of said spring, said rotatable device having limited movement in a direction to retract said bolt, said movement being sufficient to carry said pin beyond the center line so that said bolt will be retained in a retracted position until said rotatable device has been moved in a reverse direction by the key, the slot in said bolt being shaped to permit said rotatable device to have forward movement relatively to said bolt after the latter has been partly projected.

4. The combination with a tubular structure and a member rotatably mounted in said tubular structure and provided with a circumferentially arranged series of locking recesses, of a housing mounted on said tubular structure and having an opening leading to the interior of said tubular structure in line with said series of recesses, a bolt mounted in said housing and adapted to be moved into locking engagement with said rotatable member, a spring acting on said bolt to move the same into locking position, a key actuated device rotatably mounted in said housing and having an operative connection with said bolt, said rotatable device having a limited movement in a direction to retract said bolt and the connection between said device and said bolt being so arranged that when said device has been moved to the limit of its movement the bolt will be held against forward movement until said device has been actuated by its key in a forward direction, said connection between said rotatable device and said bolt also being of such a character that said rotatable device may have forward movement independently of said bolt after initial movement has been imparted to the latter.

5. The combination with a tubular structure and a member rotatably mounted in said tubular structure and provided with a circumferentially arranged series of locking recesses, of a housing mounted on said tubular structure and having an opening leading to the interior of said tubular structure in line with said series of recesses, a bolt mounted in said housing adapted to be moved into locking engagement with said rotatable member, a spring acting on said bolt to move the same into its locking position, and a key actuated device rotatably mounted in said housing and having an operative connection with said bolt, said bolt having means to check the movement of said rotatable device after it has been moved a distance slightly greater than is necessary to fully retract the bolt, whereby the action of said spring on said bolt will retain said rotatable device in the position to which it has been moved.

6. The combination with a tubular structure and a member rotatably mounted in said tubular structure and provided with a circumferentially arranged series of locking recesses, of a housing mounted on said tubular structure and having an opening leading to the interior of said tubular structure in line with said series of recesses, a bolt mounted in said housing adapted to be moved into locking engagement with said rotatable member, a spring acting on said bolt to move the same into its locking position, said bolt having a slot therein, a key actuated device rotatably mounted in said housing and having a pin arranged off center and adapted to enter the slot in said bolt, said slot being so shaped that when said key actuated device has been rotated to a position slightly beyond its rearmost position it will engage the edge of said slot and be held against further movement in that direction.

7. The combination with a tubular structure and a member rotatably mounted in said tubular structure and provided with a circumferentially arranged series of locking recesses, of a housing mounted on said tubular member and having an opening leading to the interior of said tubular structure in line with said series of recesses, a bolt slidably mounted in said housing and having a slot, a spring acting on said bolt to move the same through said opening into engagement with said rotatable member, and a key actuated rotatable device mounted in said housing and having a pin arranged to enter the slot in said bolt and move the latter against the tension of said spring, the slot in said bolt being shaped to permit said rotatable device to continue its forward movement to its normal position after the movement of said bolt has been interrupted with the bolt in a partly projected position.

8. The combination with a tubular structure, and a rotatable member mounted therein and having a locking recess, of a lock housing mounted on said structure, a plate closing one end of said housing and provided with a guideway extending lengthwise thereof, a bolt slidably mounted in said guideway and adapted to enter the recess in said rotatable member, and a bolt actuating device mounted in the other end of said housing and operatively connected with said bolt.

9. The combination with a tubular structure, a rotatable member mounted therein and having a locking recess, of a lock housing mounted on said structure, a plate closing one end of said housing and provided with a guideway extending lengthwise thereof and a recess, a bolt slidably mounted in said guideway and adapted to enter the recess in said rotatable member, a spring mounted in said recess in said end plate to actuate said bolt, and a bolt actuating device mounted in the other end of said housing and operatively connected with said bolt.

In testimony whereof I affix my signature.

JOSEPH N. KELLY.